(12) United States Patent
Hyodo et al.

(10) Patent No.: US 9,813,698 B2
(45) Date of Patent: Nov. 7, 2017

(54) IMAGE PROCESSING DEVICE, IMAGE PROCESSING METHOD, AND ELECTRONIC APPARATUS

(71) Applicant: Sony Corporation, Tokyo (JP)

(72) Inventors: Yasuhide Hyodo, Tokyo (JP); Keita Ishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 309 days.

(21) Appl. No.: 14/527,932

(22) Filed: Oct. 30, 2014

(65) Prior Publication Data

US 2015/0130914 A1 May 14, 2015

(30) Foreign Application Priority Data

Nov. 12, 2013 (JP) ................................. 2013-234412

(51) Int. Cl.
 H04N 13/04 (2006.01)
 H04N 13/00 (2006.01)

(52) U.S. Cl.
 CPC ..... *H04N 13/0447* (2013.01); *H04N 13/0018* (2013.01)

(58) Field of Classification Search
 CPC ........... H04N 13/0033; H04N 13/0425; H04N 13/0447; H04N 13/0007; H04N 13/0018
 See application file for complete search history.

(56) References Cited

U.S. PATENT DOCUMENTS 9,438,880 B2   9/2016 Hyodo et al.
9,467,677 B2   10/2016 Hyodo
(Continued)

FOREIGN PATENT DOCUMENTS

JP   08-331600 A   12/1996
JP   2006-115198 A   4/2006
(Continued)

OTHER PUBLICATIONS

Wang, Sterescopic 3D Video Quality of Experience, Impact of Coding, Transmission and Display Technologies, Mittuniversitetet Mid Sweden University, Licentiate Thesis No. 98 Sundsvall, Sweden May 2013, pp. 1-26.*

(Continued)

*Primary Examiner* — Sath V Perungavoor
*Assistant Examiner* — Peet Dhillon
(74) *Attorney, Agent, or Firm* — Wolf, Greenfield & Sacks, P.C.

(57) ABSTRACT

There is provided an image processing device including an analysis unit configured to analyze contrast according to a spatial frequency of an input image, a parallax transition information acquisition unit configured to acquire a relation of a crosstalk aggravation amount and a parallax transition corresponding to the contrast according to the spatial frequency of the input image with reference to a database in which the relation of the crosstalk aggravation amount and the parallax transition is stored in association with contrast according to spatial frequencies of various images, and a parallax computation unit configured to compute parallax corresponding to a predetermined threshold value set for the crosstalk aggravation amount in the acquired relation of the crosstalk aggravation amount and the parallax transition.

15 Claims, 11 Drawing Sheets

(56) References Cited

U.S. PATENT DOCUMENTS

| | | |
|---|---|---|
| 2008/0079805 A1 | 4/2008 | Takagi et al. |
| 2008/0273751 A1* | 11/2008 | Yuan .................. G06K 9/32 382/103 |
| 2010/0220178 A1* | 9/2010 | Takahashi ............ G09G 3/003 348/54 |
| 2011/0032340 A1 | 2/2011 | Redmann et al. |
| 2012/0200577 A1* | 8/2012 | Ishikawa ............. G06T 7/0022 345/501 |
| 2013/0147911 A1* | 6/2013 | Karsch ............... H04N 13/026 348/43 |
| 2013/0235167 A1* | 9/2013 | Izawa .................. G03B 35/24 348/51 |
| 2014/0016049 A1 | 1/2014 | Yoshikaie et al. |
| 2014/0022339 A1 | 1/2014 | Dane et al. |
| 2014/0160301 A1 | 6/2014 | Tan et al. |
| 2014/0267838 A1 | 9/2014 | Rubshtein et al. |
| 2014/0320599 A1 | 10/2014 | Blonde et al. |
| 2015/0201185 A1 | 7/2015 | Hyodo et al. |
| 2015/0222871 A1 | 8/2015 | Doba et al. |
| 2015/0229901 A1 | 8/2015 | Doba et al. |
| 2015/0229904 A1 | 8/2015 | Ishikawa et al. |
| 2015/0245007 A1 | 8/2015 | Hyodo et al. |
| 2015/0245008 A1 | 8/2015 | Hyodo |
| 2015/0294475 A1 | 10/2015 | Takahashi et al. |

FOREIGN PATENT DOCUMENTS

| | | | | |
|---|---|---|---|---|
| JP | WO 2010146930 A1 | * | 12/2010 | ........... H04N 13/021 |
| JP | EP 2760209 A1 | * | 7/2014 | ......... H04N 13/0022 |

OTHER PUBLICATIONS

Chang, Yu-Cheng et al. "10.2: Crosstalk Suppression by Image Processing in 3D Display," SID 10 Digest, Nov. 12, 2013, pp. 124-127.

Wang et al., Cross-talk reduction by correcting the subpixel position in a multiview autostereoscopic three-dimensional display, Jun. 2010, Sichuan University, China, Applied Optics, Mar. 1, 2011, vol. 50, No. 7.

U.S. Appl. No. 14/620,380, filed Feb. 12, 2015, Hyodo et al.
U.S. Appl. No. 14/626,251, filed Feb. 19, 2015, Hyodo.
U.S. Appl. No. 14/751,040, filed Jun. 25, 2015, Takahashi et al.
U.S. Appl. No. 14/591,046, filed Jan. 7, 2015, Hyodo et al.
U.S. Appl. No. 14/604,873, filed Jan. 26, 2015, Doba et al.
U.S. Appl. No. 14/612,519, filed Feb. 3, 2015, Ishikawa et al.
U.S. Appl. No. 14/612,568, filed Feb. 3, 2015, Doba et al.

* cited by examiner

FIG. 3
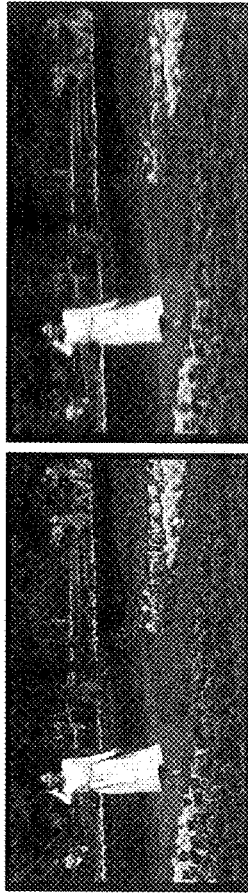
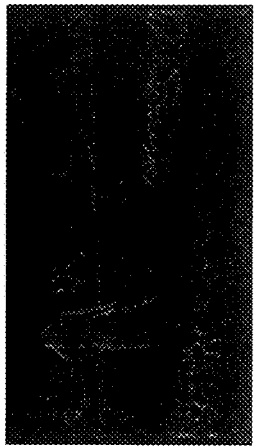

FIG. 11
- VISION SENSITIVITY IS HIGH WHEN LUMINANCE IS EQUAL TO OR LOWER THAN 100 cd/m$^2$
- VISION SENSITIVITY IS SATURATED WHEN LUMINANCE IS ABOUT 800 cd/m$^2$
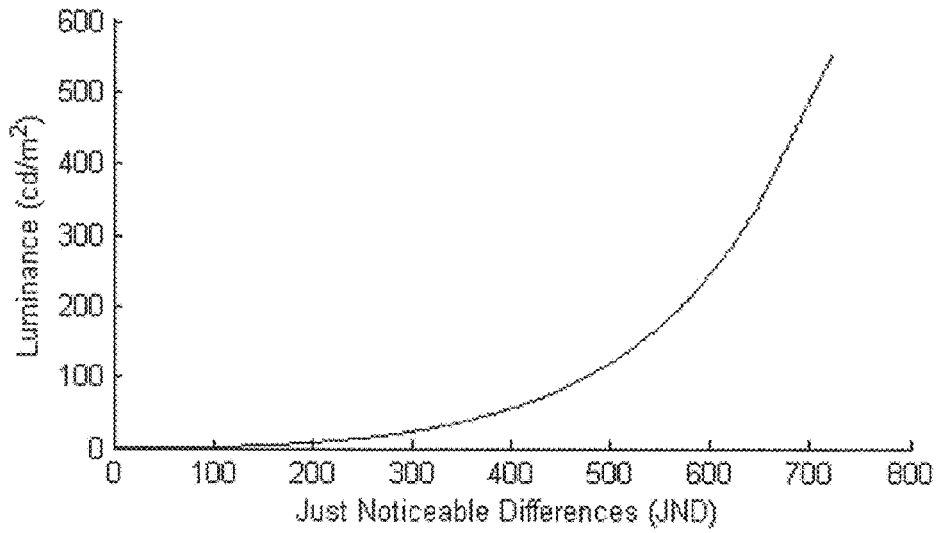
EXAMPLE OF RELATION OF VISUAL CHARACTERISTIC JND AND LUMINANCE
FIG. 12
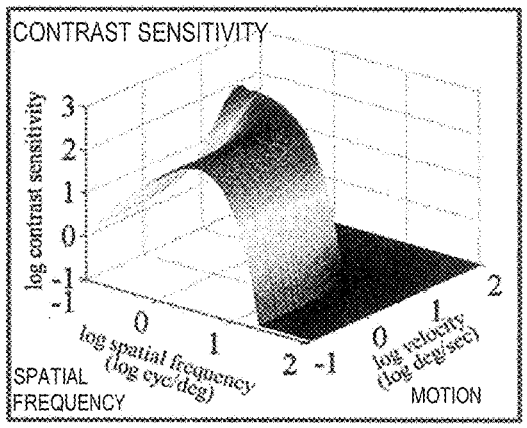
SV-CSF MODEL WITH RESPECT TO
LUMINANCE STIMULUS
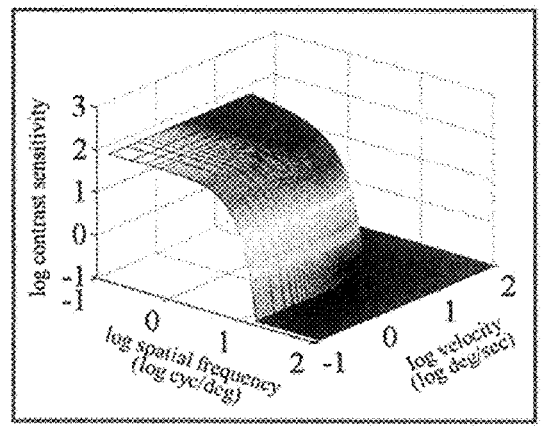
SV-CSF MODEL WITH RESPECT TO
RED-GREEN STIMULUS

IMAGE PROCESSING DEVICE, IMAGE PROCESSING METHOD, AND ELECTRONIC APPARATUS

CROSS REFERENCE TO RELATED APPLICATIONS

This application claims the benefit of Japanese Priority Patent Application JP 2013-234412 filed Nov. 12, 2013, the entire contents of which are incorporated herein by reference.

BACKGROUND

The present disclosure relates to an image processing device, an image processing method, and an electronic apparatus.

In recent years, stereoscopic display devices that can stereoscopically display content have become widespread. In such a stereoscopic display device, images for the right eye and images for the left eye are displayed on a display while being deviated from each other in the horizontal direction, a parallax amount is adjusted to the extent of the deviation, and accordingly, content is displayed at an arbitrary distance in a depth direction.

In the case of a stereoscopic display device that displays viewpoint images having two or more viewpoints, a phenomenon in which light from a neighboring viewpoint image bleeds into each of other viewpoint images arises due to an optical characteristic of a display. This phenomenon is called crosstalk. When crosstalk occurs, images that are not supposed to be displayed as stereoscopic display images for both of the right and left eyes are displayed, and thus image quality notably deteriorates. For example, FIG. 2 is a schematic diagram showing examples in which blur and a double image arise in images to be seen due to crosstalk. As shown in FIG. 2, blur and a double image occur in an image due to crosstalk and blur and a double image increase as parallax increases.

Hence, a technology for reducing crosstalk by subtracting a bleeding amount of light which comes from neighboring images and bleeds into each of viewpoint images from each of the viewpoint images in advance before the viewpoint images are displayed on a display has been developed (for example, refer to JP H08-331600A and "10.2: Crosstalk Suppression by Image Processing in 3D Display," SID 10 DIGEST, ISSN 0097-966X/10/4101-0124-$1.00, 2010 SID). In the crosstalk reduction process, a technique for reducing blur and double images is used by modeling the course of the occurrence of blur and double images into a linear matrix equation using a bleeding amount of light from neighboring viewpoint images and solving an inverse problem thereof (a contrast highlighting process is performed using an inverse matrix process).

SUMMARY

There is, however, a restriction on the range of grayscale values of an image (256 gray scales (0 to 255) in an 8-bit image), and as a result of processing an image using an inverse matrix, there are cases in which the range of the grayscale is surpassed. In such a case, the image is clipped so that grayscale values of the image fall within the range, and accordingly, a process intended in the model is not attained. In this case, contrast increases unnaturally in an image that has been processed for reduction of crosstalk, and thereby the image may become unnatural. In addition, as shown in FIG. 2, since blur and double images caused by crosstalk increase as a parallax amount of content increases, the degree of contrast highlighting in the inverse matrix process is intensified. Accordingly, there are many cases in which grayscale values surpass the range as parallax increases, and thereby performance of reducing crosstalk is hampered.

Meanwhile, another technique of reducing the occurrence of blur and double images by controlling parallax is known (for example, JP 2006-115198A). In this technique, taking display characteristics into account, a limit value of parallax display of viewpoint images to be displayed is restricted and thereby reduction of blur and double images perceived by users is realized. Even though parallax can be set to further increase depending on images, there are cases in which parallax is restricted by a set limit value of parallax display. On the other hand, when a limit value of parallax display is set to be high, blur and double images arise depending on images, which may hinder users from experiencing videos with a strong sense of presence in real scenes. In other words, since the correlation between blur and double images resulting from crosstalk and an image characteristic has not been considered, parallax display performance of a display has not been fully exhibited.

Therefore, suppressing occurrence of crosstalk to the minimum while exhibiting the parallax display performance to the maximum has been demanded.

According to an embodiment of the present disclosure, there is provided an image processing device including an analysis unit configured to analyze contrast according to a spatial frequency of an input image, a parallax transition information acquisition unit configured to acquire a relation of a crosstalk aggravation amount and a parallax transition corresponding to the contrast according to the spatial frequency of the input image with reference to a database in which the relation of the crosstalk aggravation amount and the parallax transition is stored in association with contrast according to spatial frequencies of various images, and a parallax computation unit configured to compute parallax corresponding to a predetermined threshold value set for the crosstalk aggravation amount in the acquired relation of the crosstalk aggravation amount and the parallax transition.

The image processing device may further include a phase difference conversion unit configured to convert the computed parallax into a phase difference based on parallax between a left image and a right image, and a phase difference decision unit configured to decide the phase difference in a manner that the number of pixels which exceed a limit value among pixels of the input image is equal to or smaller than a given number.

The database may store the relation of the crosstalk aggravation amount and the parallax transition as a linear function. The parallax transition information acquisition unit may estimate a slope of the function corresponding to the contrast according to the spatial frequency of the input image with reference to the database. The parallax computation unit may compute the parallax corresponding to the predetermined threshold value based on the estimated slope of the function.

The image processing device may further include a database creation unit configured to create the database through learning. The database creation unit may include a various-image analysis unit configured to analyze contrast according to spatial frequencies of various input images, and a various-image parallax transition information computation unit configured to acquire the relation of the crosstalk aggravation amount and the parallax transition using a crosstalk model formula by dividing the various images into classes based on the contrast according to the spatial frequencies.

The image processing device may further include a threshold value setting unit configured to set the predetermined threshold value. The threshold value setting unit may set the predetermined threshold value as a fixed value.

The image processing device may further include a threshold value setting unit configured to set the predetermined threshold value. The threshold value setting unit may set the predetermined threshold value based on a fixed value, luminance around a target pixel, and contrast of each spatial frequency of the target pixel.

The threshold value setting unit may set the predetermined threshold value based on the fixed value, the luminance around the target pixel, the contrast of each spatial frequency of the target pixel, and motion information of the target pixel.

According to another embodiment of the present disclosure, there is provided an image processing method including storing a relation of a crosstalk aggravation amount and a parallax transition in a database in association with contrast according to spatial frequencies of various images, analyzing contrast according to a spatial frequency of an input image, acquiring the relation of the crosstalk aggravation amount and the parallax transition corresponding to the contrast according to the spatial frequency of the input image with reference to the database, and computing parallax corresponding to a predetermined threshold value set for the crosstalk aggravation amount in the acquired relation between the crosstalk aggravation amount and the parallax transition.

The image processing method may further include converting the computed parallax into a phase difference based on parallax between a left image and a right image, and deciding the phase difference in a manner that the number of pixels which exceed a limit value among pixels of the input image is equal to or smaller than a given number.

The database may store the relation of the crosstalk aggravation amount and the parallax transition as a linear function. A slope of the function corresponding to the contrast according to the spatial frequency of the input image may be estimated with reference to the database. The parallax corresponding to the predetermined threshold value may be computed based on the estimated slop of the function.

Storage in the database may include analyzing contrast according to spatial frequencies of various input images, and dividing the various images into classes based on the contrast according to the spatial frequencies, acquiring the relation of the crosstalk aggravation amount and the parallax transition through a crosstalk model formula, and then storing the relation in the database.

The predetermined threshold value may be set as a fixed value.

The predetermined threshold value may be set based on a fixed value, luminance around a target pixel, and contrast of each spatial frequency of the target pixel.

The predetermined threshold value may be set based on the fixed value, the luminance around the target pixel, the contrast of each spatial frequency of the target pixel, and motion information of the target pixel.

According to still another embodiment of the present disclosure, there is provided an electronic apparatus including an analysis unit configured to analyze contrast according to a spatial frequency of an input image, a parallax transition information acquisition unit configured to acquire a relation of a crosstalk aggravation amount and a parallax transition corresponding to the contrast according to the spatial frequency of the input image with reference to a database in which the relation of the crosstalk aggravation amount and the parallax transition is stored in association with contrast according to spatial frequencies of various images, a parallax computation unit configured to compute parallax corresponding to a predetermined threshold value set for the crosstalk aggravation amount in the acquired relation of the crosstalk aggravation amount and the parallax transition, a phase difference conversion unit configured to convert the computed parallax into a phase difference based on parallax between a left image and a right image, a phase difference decision unit configured to decide the phase difference in a manner that the number of pixels which exceed a limit value among pixels of the input image is equal to or smaller than a given number, and a display unit configured to display the input image based on the phase difference decided by the phase difference decision unit.

According to one or more of embodiments of the present disclosure, it is possible to suppress occurrence of crosstalk to the minimum while exhibiting the parallax display performance to the maximum.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 3 is a schematic diagram showing a method of calculating an amount of aggravation caused by crosstalk;

FIG. 11 is a characteristic diagram showing the relation between a visual characteristic JND and luminance; and FIG. 12 is characteristic diagrams showing the relation between a spatial frequency, a motion of an object in an image, and contrast sensitivity.

DETAILED DESCRIPTION OF THE EMBODIMENT

Figure 1:
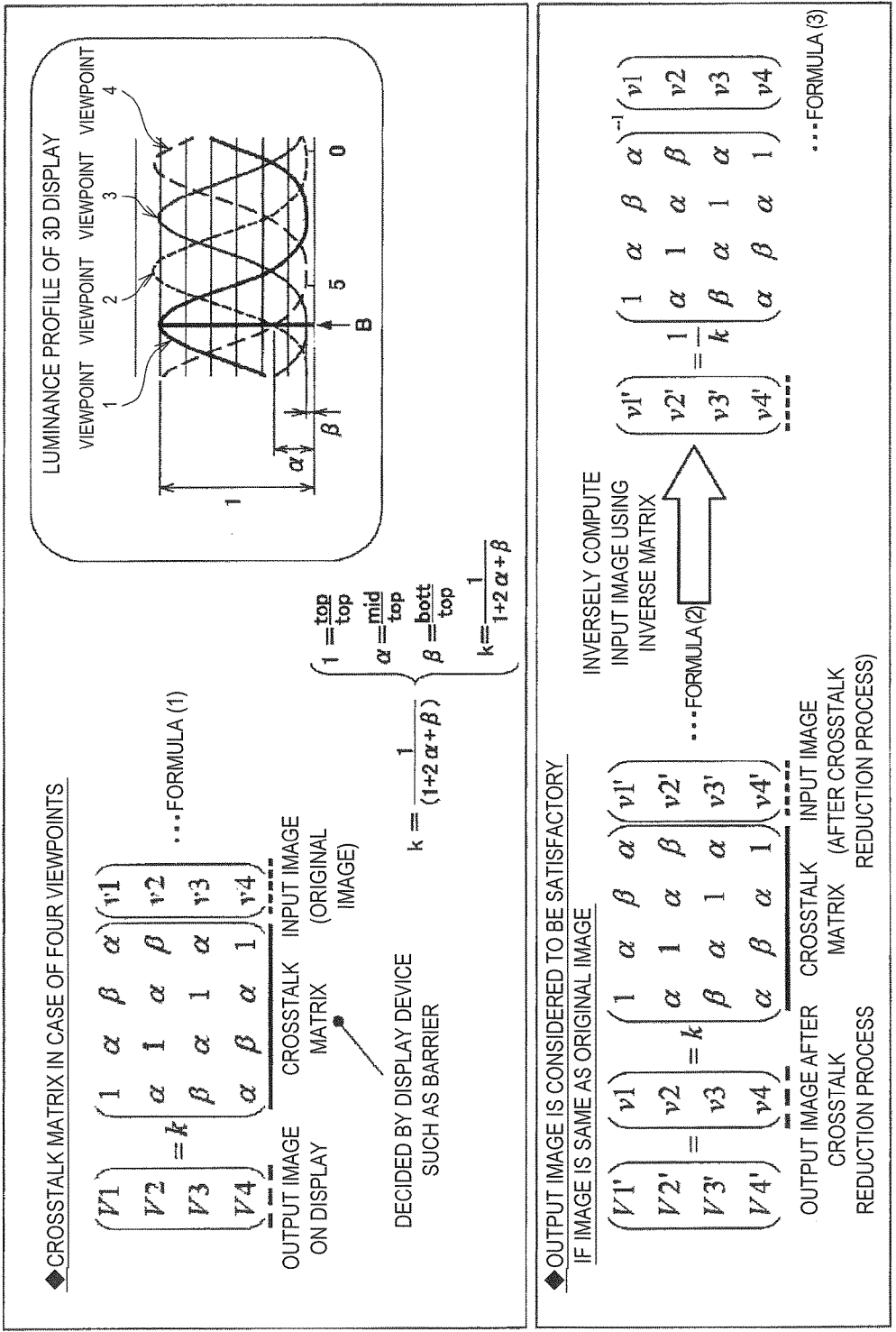
FIG. 1 is a schematic diagram showing a model formula of crosstalk.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Model formula of crosstalk
2. Estimation of a parallax transition of a crosstalk aggravation amount ΔI based on learning
3. Application to a parallax control algorithm
4. Electronic apparatus according to the present embodiment
5. Regarding a modified example

[1. Model Formula of Crosstalk]

In the present embodiment, considering the correlation between an image characteristic and a blurry image and a double image (which will be referred to hereinafter as blurry double images) arising from crosstalk, parallax control under which parallax display performance of a display is exhibited to the maximum is realized. The correlation of blurry double images arising from crosstalk and an image characteristic is elicited from a model formula of crosstalk shown in FIG. 1.

In order to describe the gist of the present embodiment, first, a perception aggravation model of a blurry double image will be described. In general, aggravation of image quality can be objectively evaluated using the difference value between a reference image F which serves as a reference of evaluation and an evaluation image G which is a target of the evaluation. If the definition is applied to occurrence of blurry double images of a stereoscopic display device, the reference image F is an original image (an image that is originally desired to be displayed) and the evaluation image G is an image that is actually viewed when parallax is applied. The difference value between the evaluation image G and the reference image F is an amount of aggravation caused by crosstalk. This calculation is performed using grayscale values of an image, however, the relation between grayscale values of an image and physical luminance of pixels is clarified as a γ characteristic. In other words, an amount of aggravation caused by crosstalk is defined as a physical amount (luminance). Hereinafter, a calculation method using grayscale values of an image will be shown.

FIG. 3 is a schematic diagram showing a method of calculating an aggravation amount using a crosstalk model formula. First, using a crosstalk model, the image to be seen G is calculated from the original image F. The crosstalk model can be obtained from a luminance profile of a display. When, for example, the eyes are at the position at which the viewpoint 5 is viewed as shown in FIG. 3, the image of the viewpoint 5 is dominantly viewed and intensity thereof is set to 1. At this time, the viewpoints 4 and 6 adjacent to the aforementioned viewpoint is viewed to the extent of α, the two adjacent viewpoints 3 and 7 thereto are viewed to the extent of β, and the viewpoints separated further therefrom are viewed to the extent of γ. Even in the cases in which the eyes are at positions other than the viewpoint 5, the relation of 1, α, β, and γ can be obtained. An expression in which the relation of the original image F and the image to be seen G is defined as a matrix based on the aforementioned relation is a crosstalk model matrix. As shown in FIG. 3, the crosstalk model matrix is defined as a diagonal matrix having elements of 1, α, β, and γ. When the crosstalk model matrix is integrated with the reference image F (original image), the image to be seen G can be generated. The crosstalk model matrix has a trait as a low-pass filter that causes blur and double images in images.

Next, the difference value between the image to be seen G (evaluation image) and the reference image F (original image), i.e., a crosstalk aggravation amount ΔI, is obtained. In the drawing on the lower right in FIG. 3, the difference between the image to be seen G (evaluation image) and the reference image F (original image) is obtained with respect to the viewpoint 4, and then the crosstalk aggravation amount ΔI is obtained. The crosstalk aggravation amount ΔI is expressed with luminance, and in the drawing on the lower right in FIG. 3, the crosstalk aggravation amount ΔI increases in regions that have higher luminance. When the iterative calculation is repeated by changing the parallax, a parallax transition of the crosstalk aggravation amount ΔI can be obtained as image data.

Figure 2:
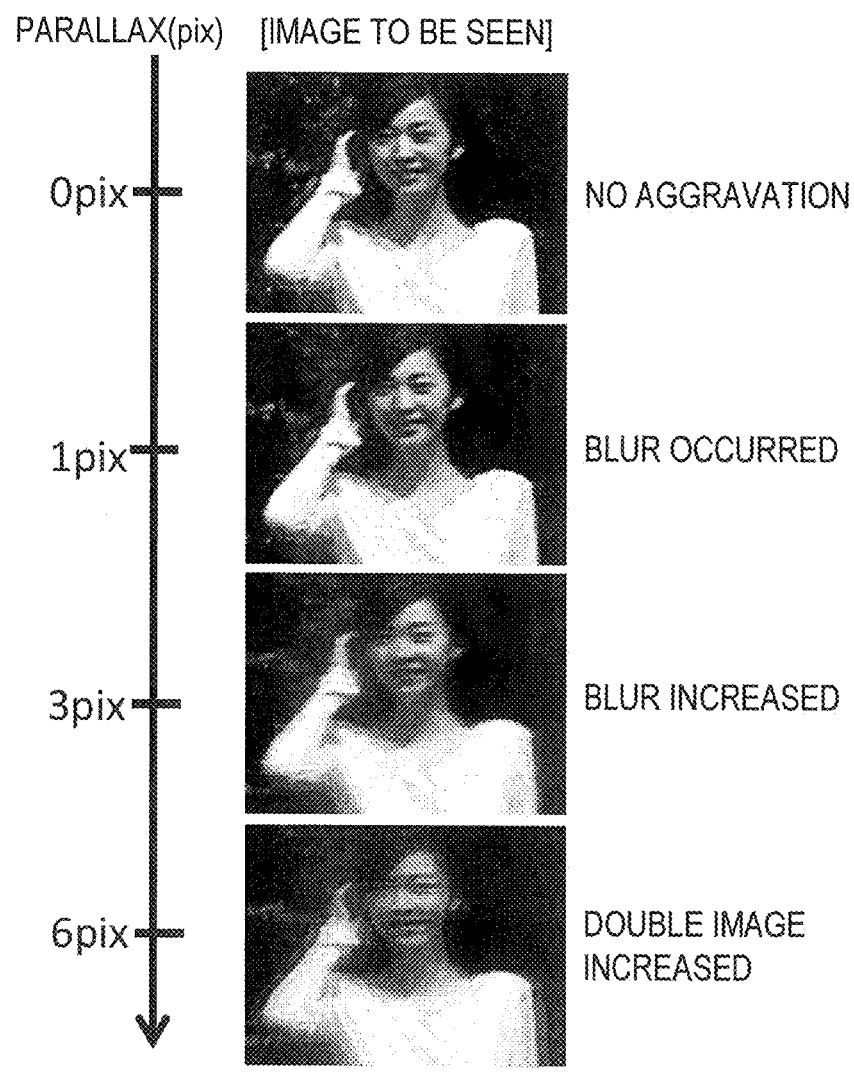
FIG. 2 is a schematic diagram showing examples in which blur and a double image arise in images to be seen due to crosstalk.
Figure 4:
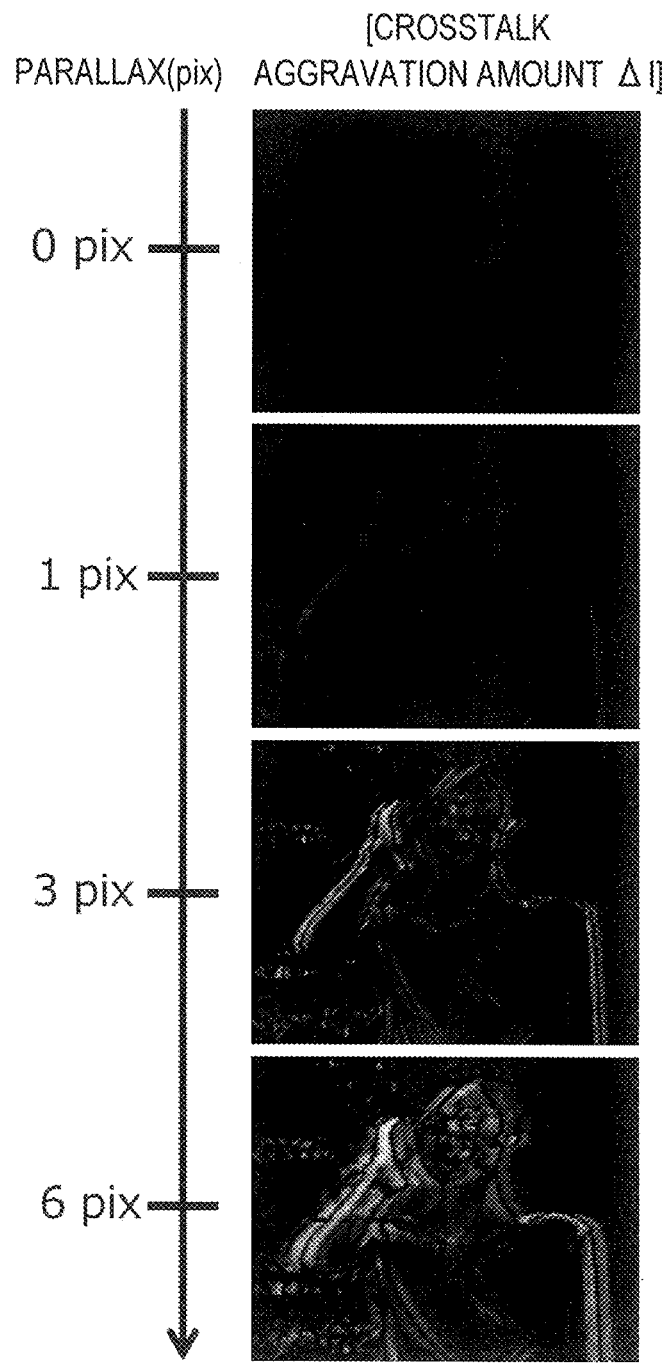
FIG. 4 is a schematic diagram showing dependency of a crosstalk aggravation amount $\Delta I$ on parallax.

FIG. 4 is a schematic diagram showing dependency of the crosstalk aggravation amount ΔI on parallax. FIG. 4 shows a state in which parallax is set to have values sequentially increasing from 0 pixels (pix) to one pixel (pix), three pixels (pix), and six pixels (pix) and accordingly crosstalk of the image to be seen G shown in FIG. 2 is aggravated. For example, an image when the parallax has the value of 0 pixels is a two-dimensional image, and a position of a three-dimensional image to be displayed in the depth direction is away from a reference position (on a display plane) when parallax has values greater than 0 pixels. As shown in FIG. 4, when parallax increases, the crosstalk aggravation amount ΔI tends to increase. When the crosstalk aggravation amount ΔI exceeds a fixed threshold value, a person perceives a blurry double image and perceives that image quality is aggravated.

In the present embodiment, using crosstalk of a device and an image characteristic, parallax in which the number of pixels which generate a blurry double image falls at or below a given number (for example, 1% of the number of pixels of a whole image) is decided.

Next, a specific realization method will be described. The present embodiment includes two parts of estimation of a parallax transition of the crosstalk aggravation amount ΔI based on learning and application thereof to a parallax control algorithm. Each of these two parts will be described in order.

[2. Estimation of a Parallax Transition of a Crosstalk Aggravation Amount ΔI Based on Learning]

As described above, by repeating the iterative calculation of FIG. 3 with respect to each of pixels and thereby obtaining the crosstalk aggravation amount ΔI for each of the pixels, parallax in which the number of pixels which generate a blurry double image falls at or below a given number (for example, 1% of the number of pixels of a whole image) can be decided. When, however, a real-time dynamic image processing is realized using the matrix expression shown in FIG. 3, the calculation of the matrix should be repeated until the crosstalk aggravation amount ΔI exceeds the above-described threshold value with respect to perception of a blurry double image, and accordingly a calculation amount increases. Therefore, in the present embodiment, by using dependency of the crosstalk aggravation amount ΔI on contrast/spatial frequency in addition to the dependency of the crosstalk aggravation amount ΔI on parallax, a framework for estimating a parallax transition of the crosstalk aggravation amount ΔI is constructed.

Figure 5:
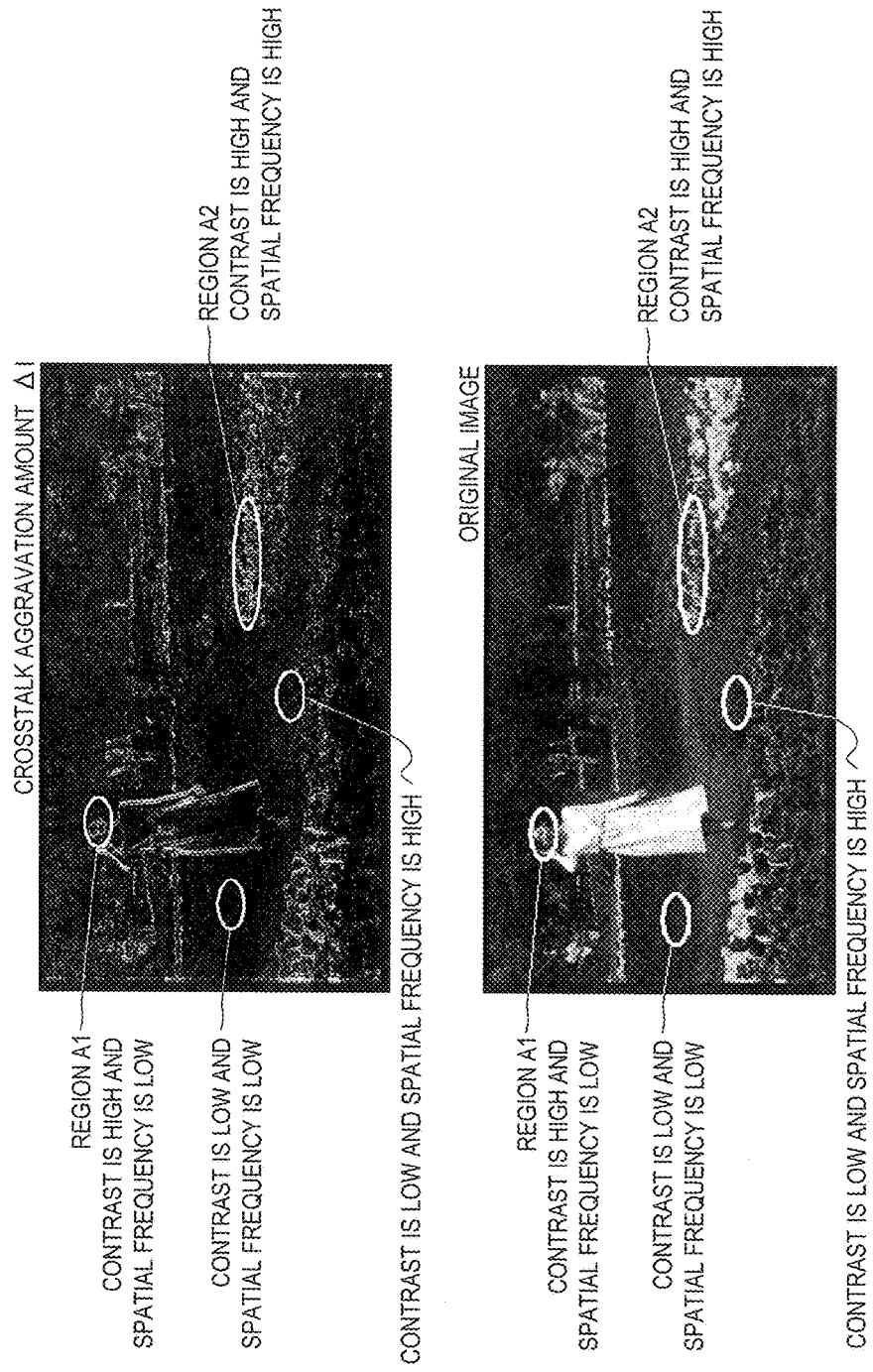
FIG. 5 is a schematic diagram showing dependency of the crosstalk aggravation amount $\Delta I$ on contrast/spatial frequency.

FIG. 5 is a schematic diagram showing dependency of the crosstalk aggravation amount ΔI on contrast/spatial frequency. FIG. 5 shows a crosstalk aggravation amount when parallax of a multi-viewpoint image is uniformly applied as in FIG. 4, showing a case in which parallax of five pixels (pix) is applied to an entire screen as an example. Herein, the drawing in the upper part of FIG. 5 shows the crosstalk aggravation amount ΔI that is obtained from the difference between the image to be seen G (evaluation image) and the reference image F (original image) using the method shown in FIG. 3. In addition, the drawing in the lower part of FIG. 5 shows the reference image F (original image). As in FIG. 3, the white portions in the image in the upper part showing the crosstalk aggravation amount ΔI indicate portions having large crosstalk aggravation amounts.

As shown in FIG. 5, the crosstalk aggravation amount ΔI sharply increases as contrast becomes higher and a spatial frequency becomes higher. For example, when crosstalk aggravation amounts ΔI of the face of the person (region A1) on the left of FIG. 5 and the stems of the flowers (region A2) on the right are compared to each other, the region A2 around the stems of the flowers is whiter than the region A1 around the face in the drawing in the upper part of FIG. 5, and thus the crosstalk aggravation amount ΔI thereof is great. On the other hand, in the original image, when the contrast/spatial frequencies of the regions A1 and A2 are compared, both of the face of the person (region A1) and the stems of the flowers (region A2) have the same degree of contrast (a dynamic range of a regional grayscale change), however, the face of the person has a low spatial frequency (a gap of spatial changes in grayscale is wide) and the stems of the flowers have a high spatial frequency (a gap between spatial changes of grayscale is narrow). In addition, regions with low contrast have small crosstalk aggravation amounts ΔI overall, however, the crosstalk aggravation amounts ΔI vary according to spatial frequencies even if contrast is the same. As such, the crosstalk aggravation amount ΔI tends to increasingly change as parallax increases, and the feature of the change has dependency on contrast/spatial frequency. Therefore, dependency of the crosstalk aggravation amount ΔI on parallax/contrast/spatial frequency can be expressed using the following formula.

$$\Delta I(C_{sf}, disp) = \sum_{i=0}^{N-1}(s_i(disp) \times C_i) + N(\sigma),$$

$$C_{sf} = (C_0, C_1, \ldots, C_{N-1}) \quad \text{formula 1}$$

Here, $C_{sf}$ is a contrast vector which is decomposed into N in number for each spatial frequency, Ci is contrast of a spatial frequency i, $s_i$ is a coefficient which indicates a degree of influence of certain parallax on deterioration of the contrast Ci, disp is parallax, and $N(\sigma)$ is a residual. Furthermore, the first term of formula 1 can be expressed as follows.

$$\Delta I(C_{sf}, disp) = \widehat{\Delta I}(C_{sf}, disp) + N(\sigma), \quad \text{formula 2}$$

When $C_{sf}$ indicating contrast/spatial frequency of formula 2 is considered to be fixed, the first term (which is referred to as ΔI hat) on the right side can be interpreted as a statistical value of a parallax transition of the crosstalk aggravation amount ΔI of $C_{sf}$. Using this property, a parallax transition graph of the crosstalk aggravation amount ΔI is learned in advance offline, and a learning result thereof is applied to real-time image processing.

Figure 6:
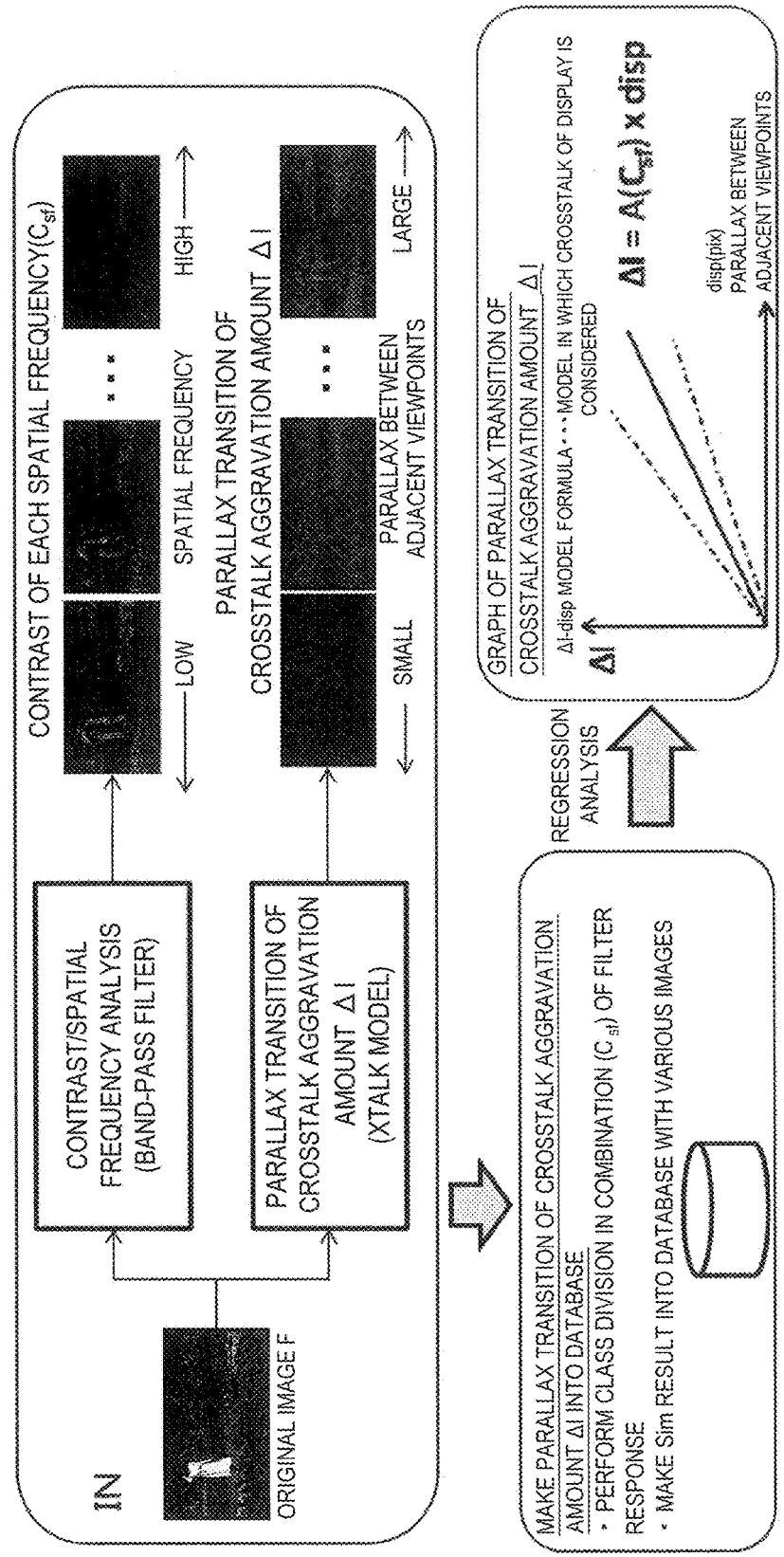
FIG. 6 is a schematic diagram showing an example of a learning method of a parallax transition graph of the crosstalk aggravation amount $\Delta I$.

FIG. 6 is a schematic diagram showing an example of a learning method of the parallax transition graph of the crosstalk aggravation amount ΔI. Herein, the learning method will be described by dividing the method into four steps. In a first step of learning, contrast/spatial frequencies of the original image F are analyzed. To be specific, using N band-pass image filters, the original image F is decomposed into contrast maps of each of N spatial frequencies. Here, as a band-pass filter, for example, an existing band-pass image filter, for example, a Gabor filter, an LOG filter, and the like can be used. Frequency components are decomposed into N in number for each spatial frequency as outputs of the N filters, and the contrast vector $C_{sf} = (C_0, C_1, \ldots, C_{N-1})$ which indicates the relation of contrast-spatial frequency is obtained for each pixel. Each component (element) of the contrast vector $C_{sf}$ indicates contrast of each spatial frequency.

As a second step, maps of the crosstalk aggravation amount ΔI are generated with various types of parallax. To be specific, multi-viewpoint images are generated while changing parallax amounts (deviation amounts of pixels) of viewpoint images, and crosstalk aggravation amounts ΔI are obtained for each parallax using a crosstalk model. In this step, the maps of the crosstalk aggravation amount ΔI are calculated for each image based on various types of parallax. In other words, sample data for calculating the statistical value ΔI hat of formula 2 is calculated. The crosstalk model of FIG. 3 is used only for creating the sample data.

As a third step, parallax transitions of the crosstalk aggravation amounts ΔI are made into a database. To be specific, using the dependency of the crosstalk aggravation amount ΔI on contrast/spatial frequency, an image is divided into classes for each $C_{sf}$ indicating contrast/spatial frequency, and data of the parallax transitions of the crosstalk aggravation amounts ΔI is retained in each class.

As an example, comparison of the crosstalk aggravation amounts ΔI of the face of the person (region A1) and the stems of the flowers (region A2) described in FIG. 5 will be described. As described above, the face of the person (region A1) and the stems of the flowers (region A2) of FIG. 5 have the same degree of contrast, but have different distributions of spatial frequencies. In distributions of spatial frequencies, spatial frequencies of the face of the person are present dominantly in low bands, and spatial frequencies of the stems of the flowers are present dominantly in high bands.

Figure 7:
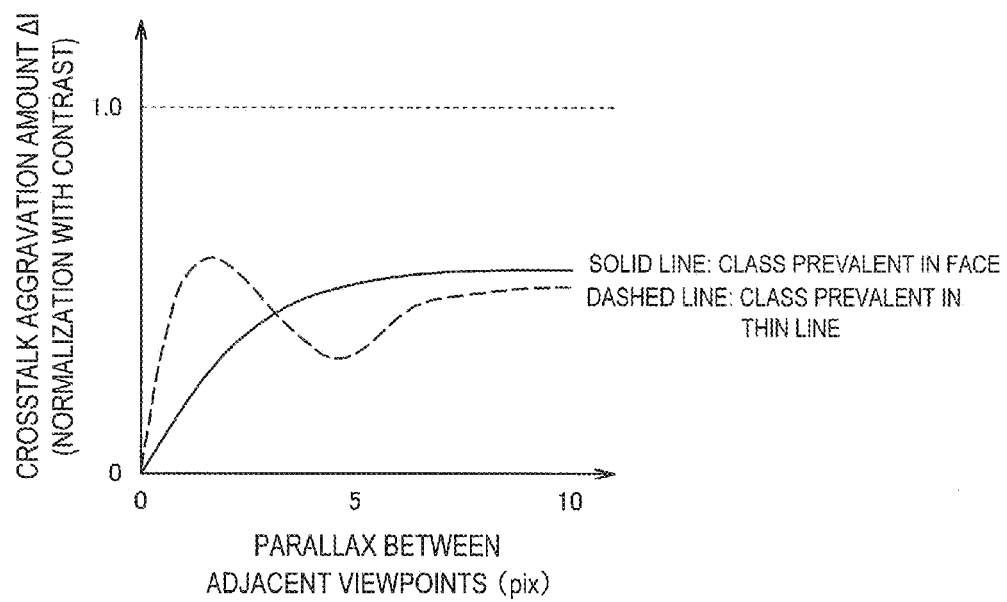
FIG. 7 is a characteristic diagram showing a result of analysis of learning data (the average of sample data of each class)

Based on FIG. 7, the first to the third steps described above will be described in detail. FIG. 7 is a characteristic diagram showing a result of analysis of learning data (the average of sample data of each class). FIG. 7 shows an example in which the number of filters is set to N=4, and responses of the band-pass filters are normalized with contrast of a dominant spatial frequency set to 1, and class division is performed according to ratios of the responses of the filters.

In the example shown in FIG. 7, contrast vectors $C_{sf} = (C_0, C_1, C_2, C_3) = (r1cpd, r2cpd, r4cpd, r8cpd)$ with which components of each of spatial frequencies are decomposed by the four filters are obtained (the first step). FIG. 7 shows contrast vectors corresponding to classes present in a large number in the image of the face of the person (region A1) and classes present in a large number in the image with thin lines such as the stems of the flowers (region A2) according to components of the obtained contrast vectors. As described above, the spatial frequencies of the face of the person are present dominantly in low bands, and spatial frequencies of the stems of the flowers are present dominantly in high bands. Thus, with regard to the contrast vectors divided into the classes present in the large number in the image of the face of the person, components corresponding to low spatial frequency bands are set to be greater than components corresponding to high spatial frequency bands. In addition, with regard to the contrast vectors divided into the classes present in the large number in the image with thin lines such as the stems of the flowers, components corresponding to high spatial frequency bands are set to be greater than components corresponding to low spatial frequency bands.

Therefore, an image can be divided into classes based on components of contrast vectors. By performing a filtering process on an arbitrary image, it is possible to determine whether the arbitrary image is an image that belongs to, for example, a class of the image of the face of the person (region A1), a class of the image of the stems of the flowers (region A2), or another class.

With regard to the contrast vectors corresponding to the classes present in the large amount in the image of the face of the person (region A1) and the classes present in the image with the thin lines such as the stems of the flowers (region A2), multi-viewpoint images are generated while changing parallax amounts (deviation amounts of pixels) of viewpoint images, and crosstalk aggravation amounts ΔI are obtained for each parallax using a crosstalk model (the second step) as shown in FIG. 7. Accordingly, parallax transition graphs of the crosstalk aggravation amounts ΔI resulting from differences of spatial frequencies are created with respect to the classes (indicated by the solid line in FIG. 7) present in the large amount in the image of the face of the person (region A1) and the classes (indicated by the dashed line in FIG. 7) present in the image with the thin lines such as the stems of the flowers (region A2) as shown in FIG. 7. When the two parallax transition graphs are compared to each other, it can be ascertained as a result that, while the parallax transition of the crosstalk aggravation amount ΔI tends to gently increase in the classes of contrast/spatial frequency distributed highly in the face of the person (region A1) on the left, the parallax transition of the crosstalk aggravation amount ΔI tends to sharply increase in the classes of contrast/spatial frequency distributed highly in the stems of the flowers (region A2) on the right. This coincides with the qualitative analysis described in FIG. 5.

Next, as a fourth step, regression analysis is performed using the least-square method for the parallax transition data of the crosstalk aggravation amount ΔI of each class obtained in the third step, and the parallax transition of the crosstalk aggravation amount ΔI is made into a function. Through the regression analysis, the crosstalk aggravation amount ΔI can be computed as a function of parallax-contrast/spatial frequency, i.e., ΔI hat. In this step, for compression of information, the crosstalk aggravation amount ΔI is made into a function having parallax/contrast/spatial frequency as arguments. In the example of FIG. 7, in the classes of contrast/spatial frequency distributed highly in the face of the person (region A1) on the left, a function in which the crosstalk aggravation amount ΔI (on the vertical axis) gently increases (indicated by the solid line of FIG. 7) with respect to the amount of an increase of parallax (on the horizontal axis) is obtained. In addition, in the classes of contrast/spatial frequency distributed highly in the stems of the flowers (region A2) on the right, a function in which the crosstalk aggravation amount ΔI (on the vertical axis) sharply increases (indicated by the dashed line of FIG. 7) with respect to the amount of an increase of parallax (on the horizontal axis) is obtained. Accordingly, the crosstalk aggravation amount ΔI can be expressed as the following formula.

$$\Delta \hat{I} = A(C_{sf}) \times disp$$

If a table having a sufficient amount of data can be retained, the average of the crosstalk aggravation amounts ΔI of classes can be calculated and retained as a table of data rather than as a function. In addition, to make a function, method of having a linear or non-linear type, or retaining a polygonal line, a domain, and a codomain may be applied.

The graph shown on the lower right in FIG. 6 shows a graph obtained in the fourth step. Note that FIG. 6 shows an example in which the relation of the crosstalk aggravation amounts ΔI and parallax is made into a linear function. In the example shown in FIG. 6, the slope that is a characteristic indicating the relation of the crosstalk aggravation amounts ΔI and parallax changes according to the type of an image. As described above, the classes distributed highly in the face of the person (region A1) form a characteristic C1 having a gentle slope and the classes distributed highly in the stems of the flowers (region A2) form a characteristic C2 having a steep slope. Through the four steps above, ΔI hat indicating formula 2 can be computed from learning.

As such, ΔI hat obtained from leaning is constructed as a database (a function, a table, or the like) which defines the relation of parallax and the crosstalk aggravation amounts ΔI for each contrast vector $C_{sf}$.

Figure 8:
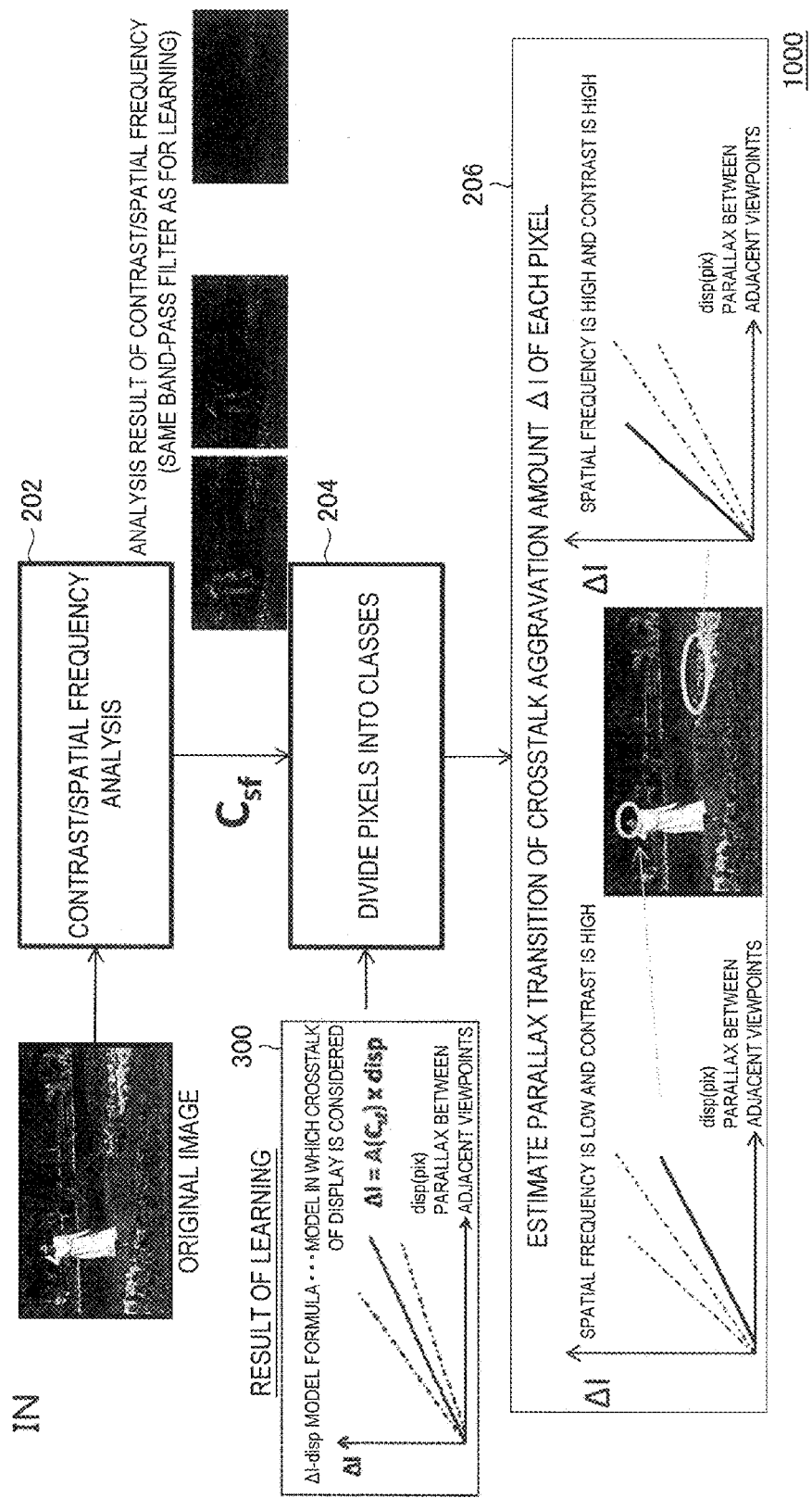
FIG. 8 is a schematic diagram showing a method of estimating parallax transition of the crosstalk aggravation amount $\Delta I$ with respect to an unknown image using a learning result.

Next, based on the learning result, a method of estimating a parallax transition of the crosstalk aggravation amounts ΔI for an unknown image will be described. FIG. 8 is a schematic diagram showing the method of estimating a parallax transition of the crosstalk aggravation amount ΔI with respect to an unknown image using the learning result. As shown in FIG. 8, an image processing device 1000 according to the present embodiment has an algorithm for estimating the parallax transition of the crosstalk aggravation amount ΔI. The algorithm for estimating the parallax transition of the crosstalk aggravation amount ΔI includes a contrast/spatial frequency analysis unit 202, a class dividing unit 204 that classifies pixels into classes, and a parallax transition estimation (acquisition) unit 206 which estimates (acquires) a parallax transition of the crosstalk aggravation amount ΔI of each pixel. First, an input image is input to the contrast/spatial frequency analysis unit 202. The contrast/spatial frequency analysis unit 202 filters the input image using the N band-pass filters, and then obtains the contrast vectors $C_{sf}=(C_0, C_1, \ldots, C_{N-1})$ for each of N spatial frequencies. This filtering is performed the same as in learning (the first step). The contrast vectors $C_{sf}$ having components of each spatial frequency obtained as above are input into the class dividing unit 204.

The class dividing unit 204 performs class division using the input contrast vectors $C_{sf}$ of each spatial frequency into classes according to $C_{sf}$ indicating contrast/spatial frequency defined during learning with reference to the data of the learning result. As described above, a database of ΔI hat that defines the relation of parallax and the crosstalk aggravation amount ΔI is constructed for each contrast vector $C_{sf}$ through learning. Thus, by dividing the contrast vectors $C_{sf}$ of the input image into classes based on components thereof, a first argument ($C_{sf}$) of the function ΔI hat in the database is decided.

Accordingly, the class dividing unit 204 can obtain a parallax transition graph (ΔI-disp graph) having parallax as a variable which corresponds to the contrast vectors $C_{sf}$ of the input image from the database of the function ΔI hat.

The parallax transition estimation unit 206 estimates a parallax transition of the crosstalk aggravation amount ΔI with respect to each pixel of the input image based on the parallax transition graph (ΔI-disp graph) corresponding to the contrast vectors $C_{sf}$ of the input image extracted by the class dividing unit 204 from the database 300. As such, it is possible to estimate a degree of the crosstalk aggravation amount ΔI in a position of parallax in an unknown image according to the divided classes by using statistical data obtained from learning.

[3. Application to a Parallax Control Algorithm]

So far, the method of estimating a parallax transition of the crosstalk aggravation amount ΔI from learning has been described. Next, an algorithm in which parallax is controlled so as to prevent a blurry double image using the estimation method and thereby maximum parallax display performance of a display is exhibited will be described.

Figure 9:
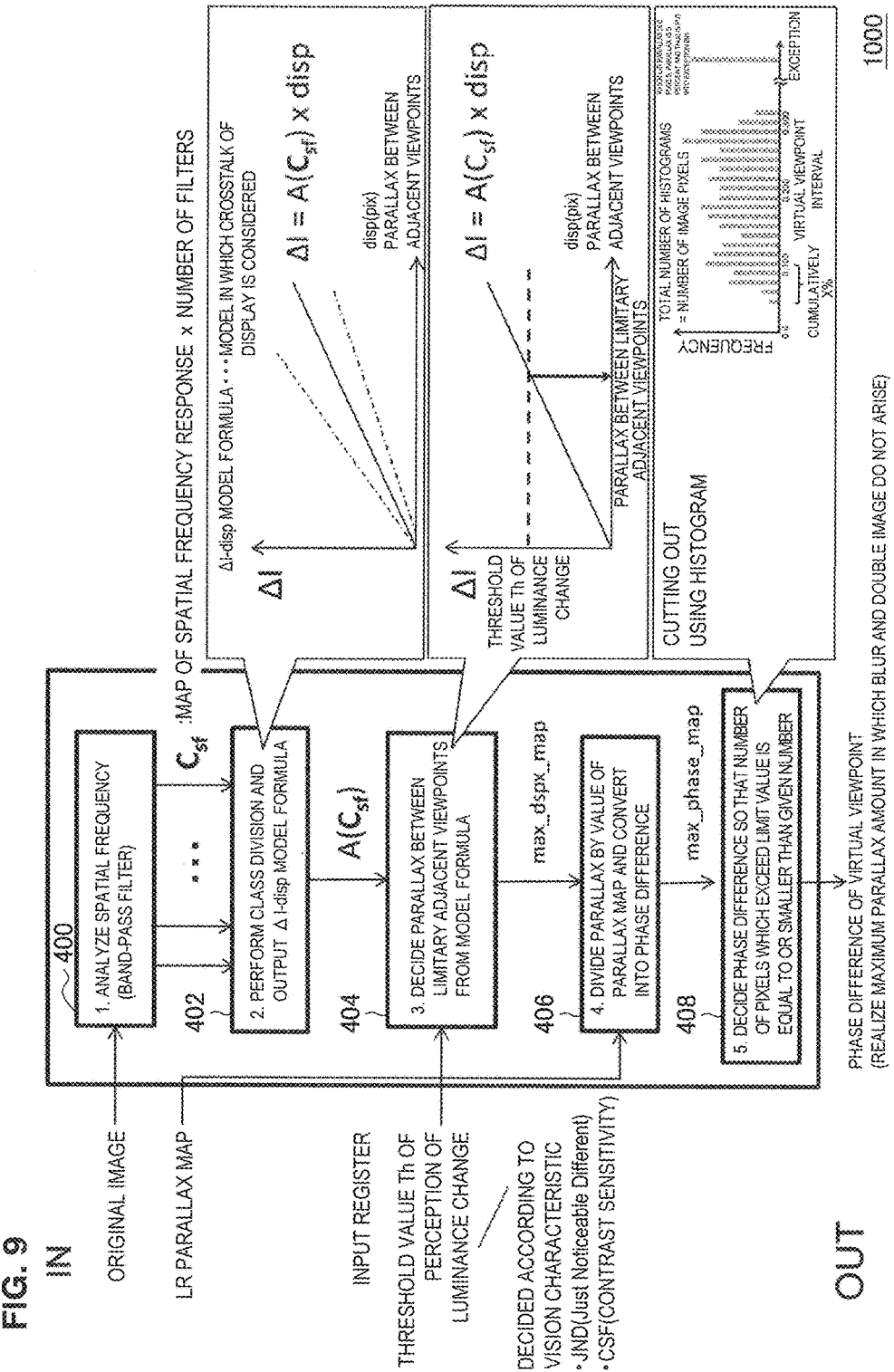
FIG. 9 is a schematic diagram for illustrating a process flow of a parallax control algorithm.

FIG. 9 is a schematic diagram for illustrating a process flow of the parallax control algorithm according to the present embodiment. This process flow is broadly divided into five steps. In a first step, an original image is analyzed using N band-pass filters and contrast vectors $C_{sf}=(C_0, C_1, \ldots, C_{N-1})$ of each of N spatial frequencies is obtained for each pixel as described above.

In a second step, class division is performed for the contrast vectors $C_{sf}=(C_0, C_1, \ldots, C_{N-1})$ of each of the N spatial frequencies, and a function of the parallax transition of the crosstalk aggravation amount ΔI or a table of a corresponding class is obtained for each pixel from learning data. When a linear function such as the graph shown on the lower right in FIG. 6 is obtained as the function of the parallax transition of the crosstalk aggravation amount ΔI, the slope A ($C_{sf}$) of the function is obtained.

In a third step, a threshold value Th of perception of the crosstalk aggravation amount ΔI is set for the function of the parallax transition of the crosstalk aggravation amount ΔI of the table obtained in the second step. Then, the number of pixels which correspond to parallax in which the crosstalk aggravation amount ΔI reaches the threshold value Th of perception is computed for each pixel. To be specific, the threshold value Th is input to the crosstalk aggravation amount ΔI of the function or the table, the inverse function for the function and corresponding parallax for the table are searched, and an amount of the corresponding parallax is obtained. Herein, since the crosstalk aggravation amount ΔI is expressed by luminance, the threshold value Th of aggravation perception is set by luminance that is optically measured. As an example, a grayscale value corresponding to 30 cd/m² is set as the threshold value Th of aggravation perception, and ΔI=30 cd/m² is set as the threshold value Th.

Furthermore, in order to further reflect the perception characteristic of a human, the threshold value Th of aggravation perception can be adaptively decided for each pixel considering the visual characteristic of a human (contrast sensitivity function (CSF), and a Just Noticeable Difference (JND)). Accordingly, the threshold value Th can be set taking differences of spatial frequencies into consideration.

FIG. 11 is a characteristic diagram showing the relation between a visual characteristic JND and luminance. As shown in FIG. 11, it is known that a human does not perceive a luminance change as a physical amount but perceives it in the form of a logarithmic function. To be specific, in a region with a relatively low luminance, the visual characteristic of a human gently increases with respect to an increase of a physical amount (cd/m²) of the luminance. In addition, in a region with a relatively high luminance, the visual characteristic of a human sharply increases with respect to an increase of a physical amount (cd/m²) of the luminance in comparison with the characteristic in a dark region. If the adaptive threshold value is set to adaTh, adaTh is obtained using the following formula. Note that the reason for deciding the threshold value Th for each pixel is that different spatial frequencies are set for respective pixels.

$$adaTh = f(Csf, Y_{ave}, Th) \quad \text{formula 3}$$

Here, $Y_{ave}$ is a lighting luminance around a pixel, and can be obtained by filtering an image using a smoothing filter such as a Gaussian filter. Formula 3 qualitatively means that the adaptive threshold adaTh of perception can be calculated with $C_{sf}$ of contrast/spatial frequency, a lighting luminance $Y_{ave}$ around a pixel, and a fixed threshold value Th (a constant) of aggravation perception. Note that the fixed threshold value Th can be set to 30 cd/m² as an example.

Furthermore, formula 3 can be calculated as, for example, the following formula 4.

$$adaTh = Th \times JND(Y_{ave}) \times \sum_{i=0}^{N-1} \left\{ \left( \frac{Ci}{\sum_{k=0}^{N-1} C_k} \right) \times \frac{1}{CSF(Ci)} \right\} \quad \text{formula 4}$$

Formula 4 qualitatively means that the adaptive threshold value adaTh of aggravation perception is obtained by integrating a constant term Th, a perception gain JND that varies according to the lighting luminance $Y_{ave}$ around a pixel, and a perception gain that varies according to contrast vectors $C_{sf}$ of respective spatial frequencies that an image has.

Furthermore, it is also known that contrast sensitivity changes due to motion information of an object such as motion blur. FIG. 12 shows characteristic diagrams showing the relation between a spatial frequency, a motion of an object in an image, and contrast sensitivity. As shown in the models with respect to luminance stimulus of FIG. 12, contrast sensitivity increases as a motion of the object becomes large. In other words, when the motion of the object becomes fast, a blurry double image is difficult to recognize.

In addition, as shown in FIG. 12, if a spatial frequency is excessively high, contrast sensitivity is difficult to perceive. For this reason, when a spatial frequency is high, the threshold value at which a luminance change is perceived can be set even higher. In addition, when a motion is fast, contrast sensitivity is difficult to perceive. For this reason, the threshold value at which a luminance change is perceived can be set even higher when a motion is fast. In this case, motion information is added to an argument of the contrast sensitivity function (CSF) of formula 4, and thereby a perception gain of contrast/spatial frequency can be changed.

As described above, when the luminance threshold value Th or adaTh of aggravation perception is obtained, the inverse function for a function and corresponding parallax for a table are searched, and then a parallax amount corresponding to the threshold value is obtained. When the function of the parallax transition of the crosstalk aggravation amount ΔI is obtained in the second step as shown in FIG. 9, a maximum parallax amount max_dspx at which aggravation is not perceived is obtained for each pixel as a parallax amount corresponding to the threshold value. In the same manner as for the table, a maximum parallax amount max_dspx at which aggravation is not perceived can be obtained for each pixel.

Up to the third step described above, the flow of calculating the maximum parallax amount max_dspx at which aggravation is not perceived has been described. Describing the example of the face of the person (region A1) and the stems of the flowers (region A2) of FIG. 5, for example, information that parallax of about five pixels is applied to the face of the person and parallax of about two pixels is applied to the stems of the flowers can be obtained.

Meanwhile, in the information obtained here, the context of an object is not considered. When parallax of a 3D image is actually controlled, it is necessary to control the parallax while maintaining the context of an object. Hence, the concept of a phase difference of viewpoint images has been introduced. For example, in left and right stereoscopic images, the phase of the left image is defined to be 0.0 and the phase of the right image is defined to be 1.0. If the concept of the phase is introduced as such, it is possible to decide a maximum parallax amount (phase difference) at which aggravation is not perceived for viewpoint images to be displayed while maintaining the context of an object.

Thus, in a fourth step, the maximum parallax amount max_dspx obtained in the third step is converted into a maximum phase difference max_phase at which aggravation is not perceived. The conversion is performed for each pixel, and specifically, calculated using the following formula.

$$\text{max\_phase} = \begin{cases} \text{max\_dspx}/\text{lr\_dspx} & \text{if lr\_dspx} \neq 0 \text{ or max\_dspx}/\text{lr\_dspx} < \text{clip\_phase} \\ \text{clip\_phase} & \text{otherwise} \end{cases} \quad \text{formula 5}$$

In formula 5, lr_dspx is parallax of left and right images, and clip_phase is the maximum phase difference set from outside. In other words, the codomain of the maximum phase difference max_phase at which aggravation is not perceived satisfies 0≤max_phase≤clip_phase. The maximum phase difference max_phase is the value obtained by dividing max_dspx obtained in the third step by the parallax of the left and right (LR) images. Accordingly, the maximum parallax amount max_dspx is converted into the maximum phase difference max_phase of the left and right images, and accordingly the context of the images is considered. The parallax lr_dspx of the left and right images is the value of parallax between the left and the right eyes with respect to pixels of an input image, and defined for each of the pixels of the input image by a left-right parallax map separately input to the image processing device 1000.

In this example, a system in which a multi-viewpoint image is generated from left and right images is assumed, however, it can be calculated in the same manner also in other methods such as those using an image and a depth map and the like by performing conversion into a deviation amount (parallax) that is projected when viewpoint images are generated from the depth map. Accordingly, a parallax map of limitary adjacent viewpoints of each pixel can be converted into a phase difference map of adjacent viewpoints of 3D images (phase map: a map which guides a level of phase difference to be applied).

Thus, in the fourth step, the maximum phase difference at which aggravation is not perceived can be obtained for each pixel. For example, describing with respect to the example of the face of the person (region A1) and the stems of the flowers (region A2) of FIG. 5, information that parallax equivalent to a maximum phase difference of about 0.20 is applied to the face of the person and parallax equivalent to a maximum phase difference of about 0.10 is applied to the stems of the flowers, or the like can be obtained.

In a fifth step, the phase difference of viewpoint images to be actually displayed is decided. In this step, using the map of the maximum phase difference max_phase obtained in the fourth step at which aggravation is not perceived, parallax at which the number of pixels with which aggravation is perceived is equal to or smaller than a given number (for example, 1% of the number of pixels of a whole image, or the like) is decided.

Figure 10:
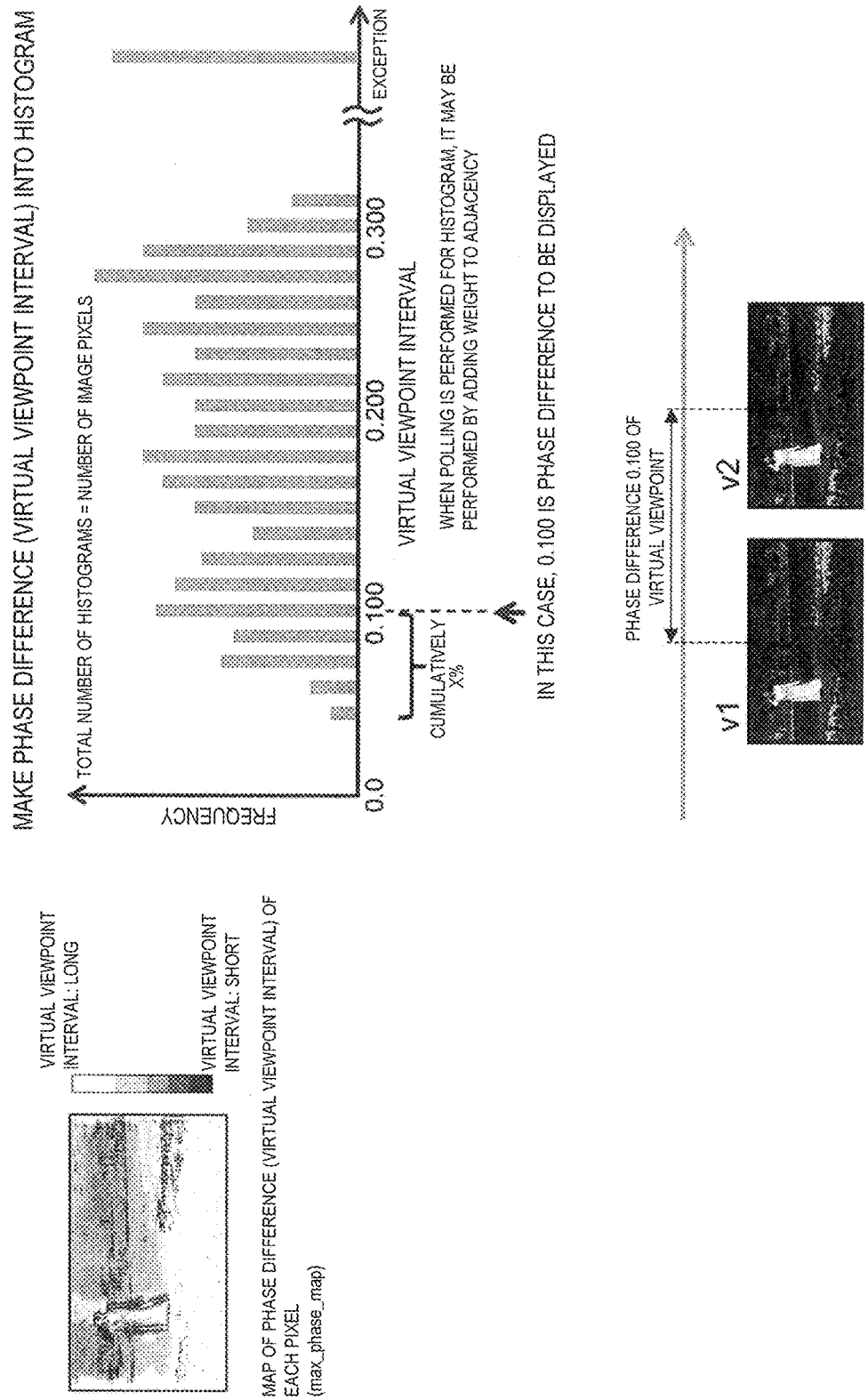
FIG. 10 shows a method of deciding a phase difference of a viewpoint image which will actually be displayed in a fifth step.

FIG. 10 shows a method of deciding a phase difference of a viewpoint image which will actually be displayed in the fifth step. As shown in FIG. 10, first, with respect to values of the map of max_phase obtained in the fourth step, the appearance frequency of max_phase values is counted using a histogram. Next, the cumulative sum of max_phase values of the histogram is calculated from those having lower frequencies. The phase difference of which the cumulative sum exceeds a threshold value CutTh is decided as a phase difference of the viewpoint image opt_phase to be actually displayed.

For example, a case in which a numeric value of CutTh= (the total number of pixels)×1% is set for the example of the face of the person (region A1) and the stems of the flowers (region A2) of FIG. 5 will be described. When the cumulative value of the histogram is calculated, the phase difference at which the cumulative sum exceeds the threshold value CutTh is about 0.100. At this moment, parallax equivalent to a maximum phase difference at which aggravation of image quality is perceived is applied to the stems of the flowers, and aggravation of image quality is not perceived in the remaining 99% of the region. In other words, the maximum phase difference at which aggravation of the image quality is not perceived in the overall image is displayed, and thereby parallax display performance of a display can be sufficiently exhibited.

As shown in FIG. 9, the image processing device 1000 is configured to have a spatial frequency analysis unit 400, a parallax transition information acquisition unit 402, a parallax-between-adjacent-viewpoints computation unit 404, a conversion unit 406, and a phase difference decision unit 408. The first to the fifth steps of the parallax control algorithm are performed by the spatial frequency analysis unit 400, the parallax transition information acquisition unit 402, the parallax-between-adjacent-viewpoints computation unit 404, the conversion unit 406, and the phase difference decision unit 408 respectively. As described above, the spatial frequency analysis unit 400 analyzes spatial frequencies of an input image. The parallax transition information acquisition unit 402 extracts a function or a table of a parallax transition of a crosstalk aggravation amount ΔI. The parallax-between-adjacent-viewpoints computation unit 404 decides parallax between adjacent viewpoints based on a threshold value. The conversion unit 406 converts the parallax between the adjacent viewpoints into a phase difference. The phase difference decision unit 408 decides a phase difference at which the number of pixels which exceed a limit value is equal to or smaller than a given number. Note that the spatial frequency analysis unit 400 corresponds to the contrast/spatial frequency analysis unit 202 of FIG. 8, and the parallax transition information acquisition unit 402 corresponds to the parallax transition estimation (acquisition) unit 206 of FIG. 8.

[4. Electronic Apparatus According to the Present Embodiment]

An input image processed by the image processing device 1000 according to the present embodiment is displayed by a display unit such as a liquid crystal display device (LCD) or the like. For this reason, an electronic apparatus according to the present embodiment includes the image processing device 1000 and a display unit. The electronic apparatus is an apparatus, for example, a television receiver set, a mobile device such as a mobile telephone or a smartphone, a digital camera, or the like. When the input image which has been processed by the image processing device 1000 is displayed on the display unit, it is possible to suppress occurrence of crosstalk to the minimum while exhibiting maximum parallax display performance.

[5. Regarding a Modified Example]

In the present embodiment, a multi-eye-type glasses-free 3D display is assumed for the sake of description and the parallax control algorithm when an observer views the display at a designed viewing distance has been described. In the designed viewing distance of the multi-eye-type glasses-free 3D display, crosstalk is evenly distributed within a display plane, which is a simple case in which a uniform crosstalk model is decided. An application target of the present disclosure, however, is not limited to the multi-eye-type glasses-free 3D display and the present disclosure can also be applied to glasses-free 3D displays of other types (for example, a light reproduction type, an integral imaging type, and the like) in which blur and double images arise due to crosstalk. In this case, a crosstalk model to be applied to learning is corrected according to a target.

Elements with which a target is decided are broadly divided into three including a device characteristic (luminance or crosstalk angle distribution), a display type (a multi-eye type, a light reproduction type, or an integral imaging type), and a viewing distance (viewing at a designed viewing distance, or at other viewing distances). According to the decision elements, distribution of crosstalk within a display plane varies. In this case, a crosstalk model matrix is constructed by selecting representative values from the distribution of crosstalk within the display plane and then applied to the process of the present embodiment.

For example, if the value of a maximum crosstalk rate (at which image quality is most easily aggravated) is selected as a representative value from the distribution of crosstalk within the display plane and applied to the present disclosure, parallax control can be performed based on the display characteristic of a region in which the image quality is most easily aggravated, and accordingly, the image quality can be guaranteed in the whole screen, and parallax control that enables exhibition of maximum parallax display performance of the display can be realized. In addition, if the value of an intermediate crosstalk rate (crosstalk of an intermediate characteristic having a characteristic of the worst image quality and a characteristic of the best image quality) is selected as a representative value from the distribution of crosstalk within the display plane and applied to the present disclosure, a process in which a tradeoff of the image quality characteristic of the entire screen is considered is realized, and accordingly, parallax can be further expanded.

In addition, according to the present embodiment, contrast/spatial frequencies or lighting luminance of an image is changed by setting a test pattern of a sinusoidal pattern as an input image, and then it is possible to ascertain whether or not the process according to the present embodiment has been executed. A cycle of a spatial change of the sinusoidal pattern indicates a spatial frequency and an amplitude thereof indicates contrast. In addition, DC components of the sinusoidal pattern indicate the lighting luminance (average luminance) of the image. When the present embodiment is applied thereto, the crosstalk aggravation amount $\Delta I$ is generated by contrast of the sinusoidal pattern, the spatial frequency, parallax, and the lighting luminance of the image, and then parallax is controlled so that the crosstalk aggravation amount $\Delta I$ falls within a threshold value of luminance decided by contrast, the spatial frequency, and the lighting luminance of the image. This state can be ascertained through optical measurement. Concretely, as a luminance value of an observation image for which parallax is intentionally set to 0 (reference image) and a luminance value of the observation image to which parallax is applied (evaluation image) are optically measured and the difference of the luminance values are taken, the crosstalk aggravation amount $\Delta I$ as a physical amount in a real space can be measured, and then it is possible to ascertain whether or not the process of the present embodiment has been performed.

According to the present embodiment described above, by considering image characteristics (contrast/spatial frequencies) in addition to display characteristics (crosstalk and luminance) and estimating a limit parallax amount at which blur and double images arise with high accuracy, maximum parallax display performance of the display can be exhibited.

In addition, compatibility of a stereoscopic sense and a depth sense and image quality which are in a trade-off relation is optimized and video experience with a strong sense of presence in real scenes can be realized. In addition, parallax of a display which is manufactured using a highly versatile technology and has a different design can be adjusted regardless of empirical values. Furthermore, since the crosstalk aggravation amount $\Delta I$ (luminance) is estimated from the display characteristics and image characteristic, it can be easily adjusted in a display having a different design. In addition, by using psychological and physical amounts quantized in vision research, parallax control can be realized with higher accuracy.

Hereinabove, although the exemplary embodiment of the present disclosure has been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present disclosure may also be configured as below.

(1) An image processing device including:

an analysis unit configured to analyze contrast according to a spatial frequency of an input image;

a parallax transition information acquisition unit configured to acquire a relation of a crosstalk aggravation amount and a parallax transition corresponding to the contrast according to the spatial frequency of the input image with reference to a database in which the relation of the crosstalk aggravation amount and the parallax transition is stored in association with contrast according to spatial frequencies of various images; and a parallax computation unit configured to compute parallax corresponding to a predetermined threshold value set for the crosstalk aggravation amount in the acquired relation of the crosstalk aggravation amount and the parallax transition.

(2) The image processing device according to (1), further including:

a phase difference conversion unit configured to convert the computed parallax into a phase difference based on parallax between a left image and a right image; and a phase difference decision unit configured to decide the phase difference in a manner that the number of pixels which exceed a limit value among pixels of the input image is equal to or smaller than a given number.

(3) The image processing device according to (1),
wherein the database stores the relation of the crosstalk aggravation amount and the parallax transition as a linear function,
wherein the parallax transition information acquisition unit estimates a slope of the function corresponding to the contrast according to the spatial frequency of the input image with reference to the database, and
wherein the parallax computation unit computes the parallax corresponding to the predetermined threshold value based on the estimated slope of the function.

(4) The image processing device according to (1), further including:
a database creation unit configured to create the database through learning,
wherein the database creation unit includes a various-image analysis unit configured to analyze contrast according to spatial frequencies of various input images, and a various-image parallax transition information computation unit configured to acquire the relation of the crosstalk aggravation amount and the parallax transition using a crosstalk model formula by dividing the various images into classes based on the contrast according to the spatial frequencies.

(5) The image processing device according to (1), further including:
a threshold value setting unit configured to set the predetermined threshold value,
wherein the threshold value setting unit sets the predetermined threshold value as a fixed value.

(6) The image processing device according to (1), further including:
a threshold value setting unit configured to set the predetermined threshold value,
wherein the threshold value setting unit sets the predetermined threshold value based on a fixed value, luminance around a target pixel, and contrast of each spatial frequency of the target pixel.

(7) The image processing device according to (6), wherein the threshold value setting unit sets the predetermined threshold value based on the fixed value, the luminance around the target pixel, the contrast of each spatial frequency of the target pixel, and motion information of the target pixel.

(8) An image processing method including:
storing a relation of a crosstalk aggravation amount and a parallax transition in a database in association with contrast according to spatial frequencies of various images;
analyzing contrast according to a spatial frequency of an input image;
acquiring the relation of the crosstalk aggravation amount and the parallax transition corresponding to the contrast according to the spatial frequency of the input image with reference to the database; and
computing parallax corresponding to a predetermined threshold value set for the crosstalk aggravation amount in the acquired relation between the crosstalk aggravation amount and the parallax transition.

(9) The image processing method according to (8), further including:
converting the computed parallax into a phase difference based on parallax between a left image and a right image; and
deciding the phase difference in a manner that the number of pixels which exceed a limit value among pixels of the input image is equal to or smaller than a given number.

(10) The image processing method according to (8),
wherein the database stores the relation of the crosstalk aggravation amount and the parallax transition as a linear function,
wherein a slope of the function corresponding to the contrast according to the spatial frequency of the input image is estimated with reference to the database, and
wherein the parallax corresponding to the predetermined threshold value is computed based on the estimated slop of the function.

(11) The image processing method according to (8), wherein storage in the database includes analyzing contrast according to spatial frequencies of various input images, and dividing the various images into classes based on the contrast according to the spatial frequencies, acquiring the relation of the crosstalk aggravation amount and the parallax transition through a crosstalk model formula, and then storing the relation in the database.

(12) The image processing method according to (8), wherein the predetermined threshold value is set as a fixed value.

(13) The image processing method according to (8), wherein the predetermined threshold value is set based on a fixed value, luminance around a target pixel, and contrast of each spatial frequency of the target pixel.

(14) The image processing method according to (13), wherein the predetermined threshold value is set based on the fixed value, the luminance around the target pixel, the contrast of each spatial frequency of the target pixel, and motion information of the target pixel.

(15) An electronic apparatus including:
an analysis unit configured to analyze contrast according to a spatial frequency of an input image;
a parallax transition information acquisition unit configured to acquire a relation of a crosstalk aggravation amount and a parallax transition corresponding to the contrast according to the spatial frequency of the input image with reference to a database in which the relation of the crosstalk aggravation amount and the parallax transition is stored in association with contrast according to spatial frequencies of various images;
a parallax computation unit configured to compute parallax corresponding to a predetermined threshold value set for the crosstalk aggravation amount in the acquired relation of the crosstalk aggravation amount and the parallax transition;
a phase difference conversion unit configured to convert the computed parallax into a phase difference based on parallax between a left image and a right image;
a phase difference decision unit configured to decide the phase difference in a manner that the number of pixels which exceed a limit value among pixels of the input image is equal to or smaller than a given number; and
a display unit configured to display the input image based on the phase difference decided by the phase difference decision unit.

What is claimed is:
1. An image processing device comprising:
image processing circuitry including a processing device and a memory encoded with instructions that, when executed by the processing device, implement:
an analysis unit configured to analyze contrast of each spatial frequency of an input image;
a parallax transition information acquisition unit configured to acquire a relation between a crosstalk aggravation amount and a parallax transition corresponding to the contrast of each spatial frequency of the input image by referring to a database in which the relation between the crosstalk aggravation amount and the parallax transition is stored in association with the contrast of each spatial frequency for various images; and a parallax computation unit configured to compute parallax corresponding to a predetermined threshold value set for the crosstalk aggravation amount in the acquired relation between the crosstalk aggravation amount and the parallax transition.

2. The image processing device according to claim 1, wherein the image processing circuitry further implements:
a phase difference conversion unit configured to convert the computed parallax into a phase difference based on parallax between a left image and a right image; and
a phase difference decision unit configured to decide the phase difference in a manner that the number of pixels which exceed a limit value among pixels of the input image is equal to or smaller than a given number.

3. The image processing device according to claim 1,
wherein the database stores the relation between the crosstalk aggravation amount and the parallax transition as a linear function,
wherein the parallax transition information acquisition unit estimates a slope of the function corresponding to the contrast of each spatial frequency of the input image by referring to the database, and
wherein the parallax computation unit computes the parallax corresponding to the predetermined threshold value based on the estimated slope of the function.

4. The image processing device according to claim 1, wherein the image processing circuitry further implements:
a database creation unit configured to create the database through learning,
wherein the database creation unit includes a various-image analysis unit configured to analyze the contrast of each spatial frequency for various input images, and a various-image parallax transition information computation unit configured to acquire the relation between the crosstalk aggravation amount and the parallax transition using a crosstalk model formula by dividing the various images into classes based on the contrast according to the spatial frequencies.

5. The image processing device according to claim 1, wherein the image processing circuitry further implements:
a threshold value setting unit configured to set the predetermined threshold value,
wherein the threshold value setting unit sets the predetermined threshold value as a fixed value.

6. The image processing device according to claim 1, wherein the image processing circuitry further implements:
a threshold value setting unit configured to set the predetermined threshold value,
wherein the threshold value setting unit sets the predetermined threshold value based on a fixed value, luminance around a target pixel, and contrast of each spatial frequency of the target pixel.

7. The image processing device according to claim 6, wherein the threshold value setting unit sets the predetermined threshold value based on the fixed value, the luminance around the target pixel, the contrast of each spatial frequency of the target pixel, and motion information of the target pixel.

8. An image processing method comprising:
storing a relation between a crosstalk aggravation amount and a parallax transition in a database in association with contrast of each spatial frequency for various images;

analyzing contrast of each spatial frequency of an input image;
acquiring the relation between the crosstalk aggravation amount and the parallax transition corresponding to the contrast of each spatial frequency of the input image by referring to the database; and
computing parallax corresponding to a predetermined threshold value set for the crosstalk aggravation amount in the acquired relation between the crosstalk aggravation amount and the parallax transition.

9. The image processing method according to claim 8, further comprising:
converting the computed parallax into a phase difference based on parallax between a left image and a right image; and
deciding the phase difference in a manner that the number of pixels which exceed a limit value among pixels of the input image is equal to or smaller than a given number.

10. The image processing method according to claim 8,
wherein the database stores the relation between the crosstalk aggravation amount and the parallax transition as a linear function,
wherein a slope of the function corresponding to the contrast of each spatial frequency of the input image is estimated by referring to the database, and
wherein the parallax corresponding to the predetermined threshold value is computed based on the estimated slope of the function.

11. The image processing method according to claim 8, wherein storage in the database includes analyzing the contrast of each spatial frequency for various input images, and dividing the various images into classes based on the contrast according to the spatial frequencies, acquiring the relation between the crosstalk aggravation amount and the parallax transition through a crosstalk model formula, and then storing the relation in the database.

12. The image processing method according to claim 8, wherein the predetermined threshold value is set as a fixed value.

13. The image processing method according to claim 8, wherein the predetermined threshold value is set based on a fixed value, luminance around a target pixel, and contrast of each spatial frequency of the target pixel.

14. The image processing method according to claim 13, wherein the predetermined threshold value is set based on the fixed value, the luminance around the target pixel, the contrast of each spatial frequency of the target pixel, and motion information of the target pixel.

15. An electronic apparatus comprising:
an image processing device including a processing device and a memory encoded with instructions that, when executed by the processing device, implement:
an analysis unit configured to analyze contrast of each spatial frequency of an input image;
a parallax transition information acquisition unit configured to acquire a relation between a crosstalk aggravation amount and a parallax transition corresponding to the contrast of each spatial frequency of the input image by referring to a database in which the relation between the crosstalk aggravation amount and the parallax transition is stored in association with the contrast of each spatial frequency for various images;
a parallax computation unit configured to compute parallax corresponding to a predetermined threshold value set for the crosstalk aggravation amount in the acquired relation between the crosstalk aggravation amount and the parallax transition;

a phase difference conversion unit configured to convert the computed parallax into a phase difference based on parallax between a left image and a right image; and a phase difference decision unit configured to decide the phase difference in a manner that the number of pixels which exceed a limit value among pixels of the input image is equal to or smaller than a given number; and a display unit configured to display the input image based on the phase difference decided by the phase difference decision unit.

* * * * *